(12) United States Patent
Ravindranath

(10) Patent No.: US 12,449,203 B2
(45) Date of Patent: Oct. 21, 2025

(54) HEAT EXCHANGER

(71) Applicant: Transportation IP Holdings, LLC, Norwalk, CT (US)

(72) Inventor: Balaji Hosadurgam Ravindranath, Mysore (IN)

(73) Assignee: Transportation IP Holdings, LLC, Norwalk, CT (US)

(*) Notice: Subject to any disclaimer, the term of this patent is extended or adjusted under 35 U.S.C. 154(b) by 690 days.

(21) Appl. No.: 17/152,789

(22) Filed: Jan. 19, 2021

(65) Prior Publication Data
US 2022/0065540 A1 Mar. 3, 2022

Related U.S. Application Data

(60) Provisional application No. 63/074,215, filed on Sep. 3, 2020.

(51) Int. Cl.
| | | |
|---|---|---|
| F28D 1/053 | (2006.01) | |
| F24F 1/0059 | (2019.01) | |
| F24F 13/30 | (2006.01) | |
| F28F 1/20 | (2006.01) | |

(52) U.S. Cl.
CPC ........ *F28D 1/05383* (2013.01); *F24F 1/0059* (2013.01); *F24F 13/30* (2013.01); *F28F 1/20* (2013.01); *F28F 2215/08* (2013.01)

(58) Field of Classification Search
CPC ..... F28D 1/05383; F28F 1/20; F28F 2215/08; F24F 1/0059
USPC .......................................................... 165/181
See application file for complete search history.

(56) References Cited

U.S. PATENT DOCUMENTS

| | | | |
|---|---|---|---|
| 3,397,741 A | | 8/1968 | Gunter |
| 4,657,070 A | * | 4/1987 | Kluppel .................. F28B 1/06 165/110 |
| 5,501,270 A | * | 3/1996 | Young ..................... F28F 1/325 165/182 |
| 5,617,916 A | * | 4/1997 | Shigenaka ............... F28F 1/36 165/184 |

(Continued)

FOREIGN PATENT DOCUMENTS

| | | |
|---|---|---|
| CN | 101403576 A | 4/2009 |
| CN | 102132431 A | 7/2011 |

(Continued)

OTHER PUBLICATIONS

English translation of Search Report for related Eurasian Patent Application No. 202192141 mailed Feb. 11, 2022 (2 pages).
Search Report for related Eurasian Patent Application No. 202192141 mailed Feb. 11, 2022 (3 pages).

(Continued)

*Primary Examiner* — Jon T. Schermerhorn, Jr.
(74) *Attorney, Agent, or Firm* — K&L Gates LLP

(57) ABSTRACT

A heat exchanger includes a first fluid carrying conduit extending along a first conduit axis and configured to convey a first fluid at a first temperature, and a second fluid carrying conduit extending along a second conduit axis and configured to convey a second fluid at a cooler, second temperature. The heat exchanger also includes at least one fin having a first opening for coupling to the first fluid carrying conduit and a second opening for coupling to the second fluid carrying conduit. The at least one fin extends along a fin axis that subtends an acute angle or obtuse angle with at least one of the first conduit axis or the second conduit axis.

18 Claims, 3 Drawing Sheets

(56) References Cited

U.S. PATENT DOCUMENTS

| | | | |
|---|---|---|---|
| 6,883,598 B2 * | 4/2005 | Sandberg | F28F 1/128 165/181 |
| 8,020,298 B2 * | 9/2011 | Campbell | F28F 1/126 29/890.035 |
| 2005/0189092 A1 | 9/2005 | Jahn et al. | |
| 2017/0191766 A1 | 7/2017 | Karatas et al. | |

FOREIGN PATENT DOCUMENTS

| | | |
|---|---|---|
| CN | 102778149 A | 11/2012 |
| CN | 202885117 U | 4/2013 |
| CN | 110546450 A | 12/2019 |
| DE | 4035912 A1 | 3/2005 |
| DE | 102017217567 A1 | 4/2019 |
| FR | 2651568 A1 | 3/1991 |
| JP | 2006162179 A | 6/2006 |
| WO | 2000000778 A2 | 1/2000 |

OTHER PUBLICATIONS

Office Action for related Eurasian Patent Application No. 202192141 dated Dec. 27, 2022 (4 pages).

Office Action for related German Patent Application No. 10 2021 121 432.7 dated Apr. 14, 2022 (3 pages).

Machine translation of Office Action for related German Patent Application No. 10 2021 121 432.7 dated Apr. 14, 2022 (3 pages).

English Translation of the Office Action for related Eurasian Patent Application No. 202192141 dated Aug. 8, 2022 (2 pages).

Office Action for related Eurasian Patent Application No. 202192141 dated Aug. 8, 2022 (2 pages).

Rejection Decision for related Eurasian Patent Application No. 202192141 dated Jul. 10, 2023 (16 pages).

Second Office Action mailed Feb. 7, 2024 for corresponding Chinese Application No. 202111032301.9 (20 pages).

First Office Action mailed Jul. 29, 2023 for corresponding Chinese Application No. 202111032301.9 (20 pages).

* cited by examiner

HEAT EXCHANGER

CROSS-REFERENCE TO RELATED APPLICATIONS

This application claims priority to U.S. Provisional Application No. 63/074,215 filed 3 Sep. 2020, hereby incorporated by reference herein.

BACKGROUND

Technical Field

The subject matter described relates to heat exchangers.

Discussion of Art

Heat exchangers are used for many different applications. Whether in association with a turbine, compressor, heating and air conditioning units, etc., heat exchangers transfer heat between two systems. Typically, a heat exchanger will include a first fluid conduit that conveys a fluid from a first system that enters the heat exchanger at a first higher temperature, and a second fluid conduit that conveys a fluid from a second system that enters the heat exchanger at a second lower temperature. Within the heat exchanger, the heat from the fluid in the first fluid conduit is conveyed to the fluid in the second fluid conduit. In this manner, the temperature of the fluid in the first fluid conduit decreases within the heat exchanger, while the fluid in the second fluid conduit increases. The first and second conduits may then exit the heat exchanger for use.

As one example of a heat exchanger, a heat exchanger with a first conduit and second conduit may be disposed through a plurality of plates, or fins. The fins extend from the first fluid conduit into the second fluid conduit to provide a heat-transfer pathway from the first conduit to the second conduit. Still, as mechanical devices continue to advance, increasing the heat exchanged from the first conduit to the second conduit is desired, with the least material and effort that goes into making the heat exchanger in purview. It may be desirable to have a heat exchanger with features that differ from those that are currently available.

BRIEF DESCRIPTION

In one or more embodiments, a heat exchanger may include a first fluid carrying conduit extending along a first axis and may be configured to convey a first fluid at a first temperature. The heat exchanger may also include a second fluid carrying conduit extending along a second conduit axis and configured to convey a second fluid at a cooler, second temperature, and at least one fin having a first opening for coupling to the first fluid carrying conduit and a second opening for coupling to the second fluid carrying conduit. The at least one fin may extend along a fin axis that forms an acute angle or obtuse angle with at least one of the first conduit axis or the second conduit axis.

In one or more embodiments, a heat exchanger may include a fluid carrying conduit extending along an axis. The heat exchanger may also provide a first fin having a first opening for receiving the fluid carrying conduit. The first fin may have a front surface and a back surface, the front surface and the back surface each intersecting the axis to form an acute or obtuse angle with the axis.

In one or more embodiments, a heat exchanger may include a first fluid carrying conduit extending along a first axis and configured to convey a first fluid at a first temperature, and a second fluid carrying conduit extending along a second conduit axis and configured to convey a second fluid at a cooler, second temperature. The heat exchanger may include a first fin that may have a first opening for receiving the first fluid carrying conduit, and a second opening for receiving the second fluid carrying conduit, the first fin extending between the first fluid carrying conduit and the second fluid carrying conduit. The heat exchanger may also include a second fin that may have a first opening for receiving the first fluid carrying conduit and a second opening for receiving the second fluid carrying conduit, the second fin spaced from the first fin and extending between the first fluid carrying conduit and the second fluid carrying conduit. Additionally, the first fluid carrying conduit, the second fluid carrying conduit, the first fin, and the second fin may form a rhomboid.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to a heat exchanger that includes a first conduit for carrying fluid that enters the heat exchanger with a first temperature and exits the heat exchanger at a second temperature that is less than the first temperature. The heat exchanger also includes a second conduit for carrying fluid that enters the heat exchanger at a third temperature, and exits the heat exchanger at a fourth temperature that is more than the third temperature.

The first and second conduits are coupled to plural fins that are angled to the first conduit and second conduit to form either an acute or obtuse angle with each conduit. In one example, the plural fins are each interconnected to one another similar to an accordion or spring. By having the plural fins angled to the first conduit and second conduit, the surface area of the fin that engages each of the first conduit and second conduit is increased. Consequently, the amount of heat conveyed from the first conduit to the second conduit for a set of flow conditions and geometry increases compared to a heat exchanger that does not have fins at an acute or obtuse angle to the first conduit and/or second conduit. Additionally, as a result of the angling, the height of the heat exchanger is not increased, allowing for a manufacturing change that increases the amount of heat transferred that does not require additional modifications so that the heat exchanger can fit within a given area.

Figure 1:
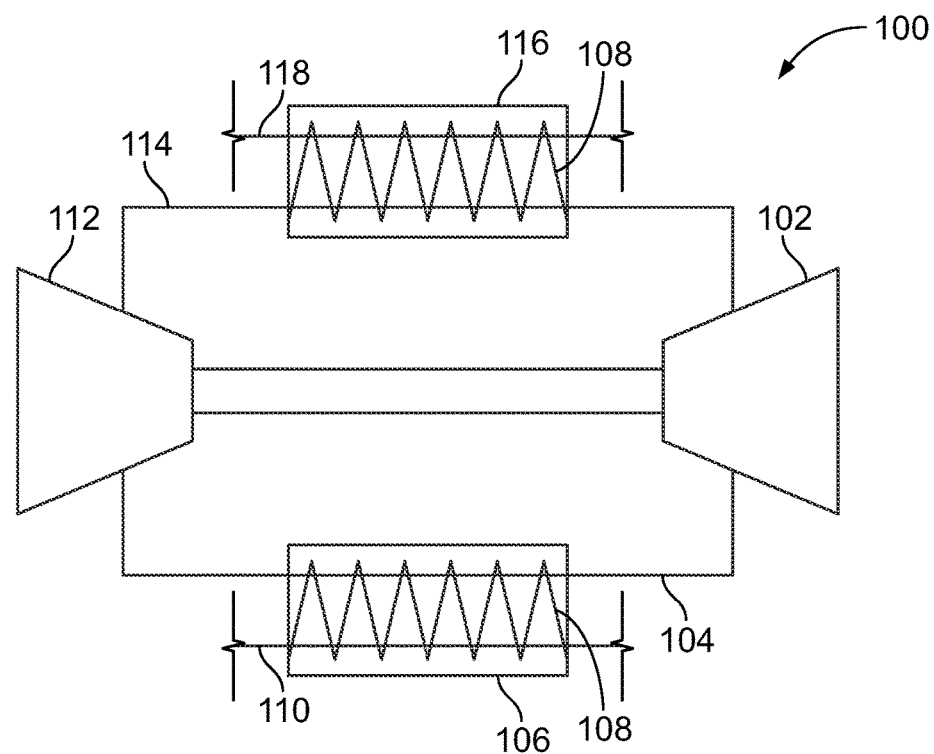
FIG. 1 illustrates a schematic diagram of a gas turbine system.

FIG. 1 illustrates a gas turbine system 100. The gas turbine system includes a turbine 102 that rejects heat that is expelled into fluid within a first fluid conduit 104. The fluid may be either a liquid, or a gas, including a high pressure gas. A suitable liquid may be water, may or include water as a solution or an emulsion, may be steam, a pure substance, or the like. A suitable solution may include water and a glycol. Another liquid may include lubricants, such as engine lubricants. Other additives may be added to the fluid, such as anti-corrosion, lubricant, anti-foam, dispersants, and the like. These additives may condition the fluid and/or the surfaces into which it comes in contact. Suitable gases may include air, refrigerants and combustion by-products.

The first fluid conduit may have a circular cross-section, square cross-section, rectangular cross section, etc. The first fluid conduit extends into a first heat exchanger 106 where plural fins 108 transfer heat from the first fluid conduit to a second fluid conduit 110 that exits the heat exchanger. While the heat exchanger is described in relation to a gas turbine system, this is for exemplary purposes only, and the heat exchanger may alternatively be part of a heating and/or air conditioning unit, engine, or the like. The second fluid conduit may convey the heat added to the fluid therein to a wastewater facility, reuse the heated fluid within the gas turbine system, or the like. The first fluid conduit meanwhile exits the heat exchanger and may be conveyed to a compressor 112.

Within the compressor, the fluid within the first fluid conduit may be compressed, and conveyed to a third fluid conduit 114 that conveys the fluid to a second heat exchanger 116. In one example, the second heat exchanger may be within the same housing of the first heat exchanger. To this end, the third fluid conduit may be fluidly coupled to either or both of the first fluid conduit and second fluid conduit. In one example, the third fluid conduit may convey cooled fluid into the second heat exchanger where optionally a combustion device may be used to increase the temperature of the fluid. Alternatively, heated fluid may be introduced by a fourth fluid conduit 118. In one example, the fourth fluid conduit is fluidly coupled to the first fluid conduit.

In one example, only a single heat exchanger may be provided with heated fluid flowing from the turbine being used to heat fluid going to the turbine. Thus, a compressor and turbine system is provided where an example heat exchanger or multiple heat exchangers may be implemented.

Figure 2:
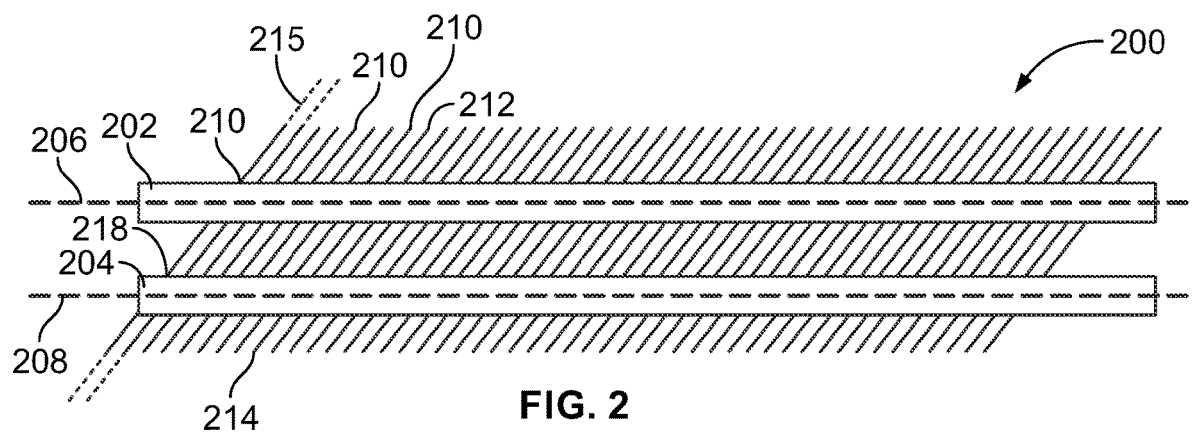
FIG. 2 illustrates a top view of a heat exchanger.
Figure 3:
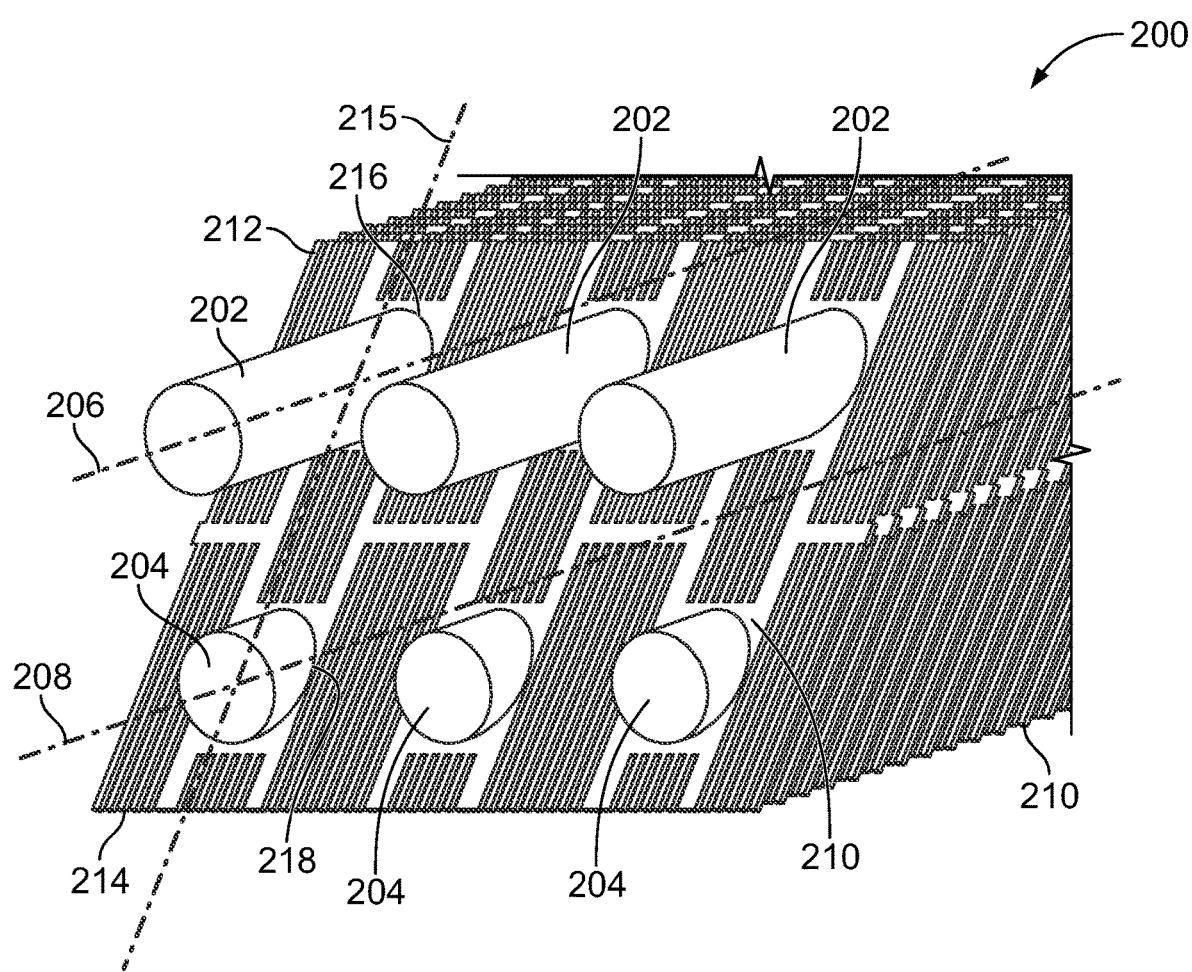
FIG. 3 illustrates a partial perspective view of a heat exchanger.

FIG. 2 illustrates a partial schematic top view of a heat exchanger 200, while FIG. 3 illustrates a partial perspective view of the heat exchanger. The heat exchanger includes a first fluid carrying conduit 202 and a second fluid carrying conduit 204. The first and second fluid carrying conduits as illustrated have circular cross sections. In other examples, similar to discussed in relation to the heat exchanger of FIG. 1, each fluid carrying conduit may include square cross-sections, rectangular cross-section, triangular cross-sections, etc. The fluid may be a liquid, gas, mixture of liquid and gas, high pressure fluid, pure substance, etc.

The first fluid carrying conduit extends along a first conduit axis 206. Meanwhile, the second fluid carrying conduit extends along a second conduit axis 208. The first conduit axis and second conduit axis may extend parallel to one another. Alternatively, the first conduit axis and second conduit axis may be transverse to one another.

The heat exchanger additionally includes plural fins 210 that extend from a first end 212 to a second end 214 along a fin axis 215. In one example, the fins are formed of copper to enhance heat transfer capabilities. Each fin includes a first opening 216 that receives the first fluid conduit, and a second opening 218 that receives the second conduit. In one embodiment, a seal may be provided between an opening and conduit. Suitable materials for the seal may include metals, particularly soft metals such as copper, aluminum, zinc and lead. Other suitable materials may include polymers, particularly high temperature capable polymeric materials. These polymeric materials may include fillers, and these fillers may be non-polymeric. An example of a filled polymer may be a nylon filled with copper flake. In one embodiment, the seal may have additional heat transfer enhancing characteristics like a thermal gel or paste. This compound may be introduced to not only seal the cavity but improve heat transfer between the fluid conduit and the fin.

Each fin is angled such that the fin axis forms either an acute or obtuse angle with each of the first fluid conduit and second fluid conduit. In one example each fin may be in parallel spaced relation to another fin. Specifically, the first fluid carrying conduit, the second fluid carrying conduit, a first fin, and a second fin form a rhomboid, such that plural rhomboids are formed along the fluid carrying conduits. Additionally, the angle subtended by the fin with the first conduit and the second conduit may be different, including when the fin is a formed fin, or bent. For example, the fin may subtend the first fluid carrying conduit at a 45° angle, and bend to subtend the second fluid carrying conduit at 60°.

As a result of the fin axis being angled as compared to the first and second fluid carrying conduits, in the example of a circular cross-sectional conduit, the perimeter of the first opening and second opening form a first elongated ellipse and a second elongated ellipse. Consequently, the surface area of the perimeter of the ellipse opening is greater than if the fin axis was perpendicular to the first fluid conduit and/or second fluid conduit and merely a circular opening. This principle applies to a cross-sectional conduit. Because of the increase of the surface area between the engagement or conduction pathway between the fluid carrying conduits and a corresponding fin, a greater amount of heat is transferred from the fluid carrying conduit to the fin compared to fluid carrying conduit and fins where the surface area is smaller.

In one example, the acute angle between the fin axis of at least one fin, and the first conduit axis and/or second conduit axis is approximately forty-five degrees (45°). A suitable obtuse may be is one-hundred and thirty-five degrees (135°). A suitable angle between the fin axis of at least one fin and the first conduit axis and/or second conduit axis may be in a range of from about 15° to about 75°, in a range of from about 75° to about 105°, or in a range of from about 105° to about 155°. In one embodiment, a suitable angle between the fin axis of at least one fin and the first conduit axis and/or second conduit axis may be less than about 25°. In one embodiment, a suitable angle between the fin axis of at least one fin and the first conduit axis and/or second conduit axis may be greater than about 155°. Selection of the angle may be made based on application specific criteria.

In sum, by increasing the surface area that engages, and is adjacent to each fluid carrying conduit, the conductive heat transfer area between the respective fluid conduit and the fin increases, resulting in greater and more efficient heat transfer between the respective fluid conduit and the fin. In addition, because the fins are angled, this increased and more efficient heat transfer may be achieved, without increasing the dimensions (height, length, or width) of the heat exchanger. Therefore, the increased heat transfer and more efficient heat transfer is accomplished without adding additional design constraints that could affect placement of the heat exchanger within an existing system. In this manner, the heat exchanger as described may be used to replace existing heat exchangers. To this end, because more heat is being transferred as a result of the angled fins, less fins may be used to accomplish a desired heat transfer, allowing for a reduction of size and weight of the heat exchanger, providing significant design flexibility. In addition, angling the fins may be easily accomplished within a manufacturing process.

Figure 4:
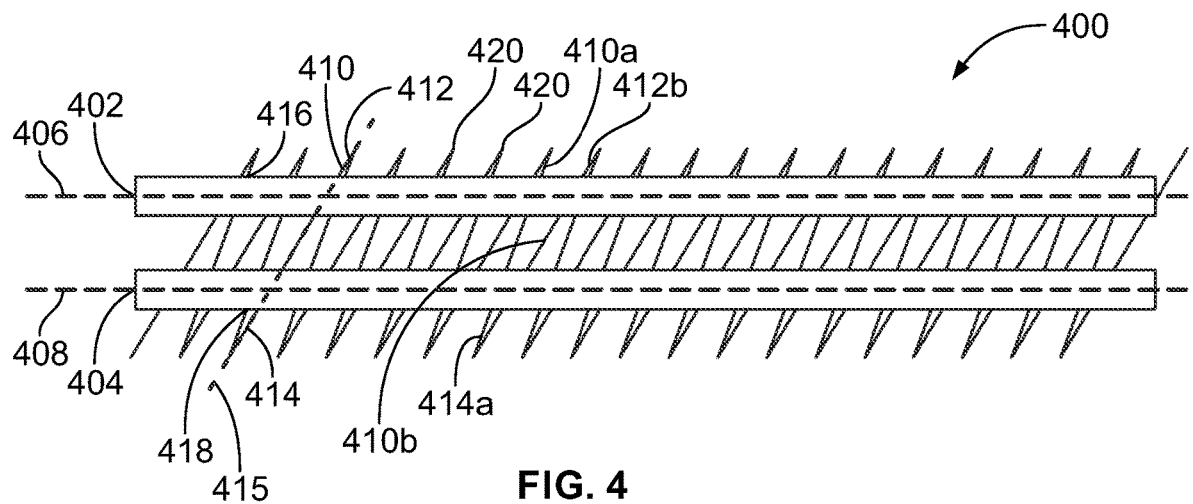
FIG. 4 illustrates a partial cross-section view of a heat exchanger.

FIG. 4 illustrates an alternative heat exchanger 400. In the embodiment of FIG. 4, the heat exchanger again includes the first fluid carrying conduit 402, and second fluid carrying conduit 404 similar to the embodiment of FIGS. 2 and 3. The first fluid carrying conduit again has a first conduit axis 406 and second conduit axis 408. The heat exchanger also includes plural fins 410 that extend from a first end 412 to a second end 414 along a fin axis 415.

Each fin may include a first opening 416 that receives the first fluid carrying conduit, and a second opening 418, where the first conduit axis and second conduit axis are transverse, or angled, to the fin axis. However, in the example of FIG. 4, the plural fins are of one piece construction. Specifically, at the second end 414a of a first fin 410 couples to a first end 412b of a second fin 410b at a seam 420. In this manner, the plural fins form an accordion, or spring-like body. Then, during the manufacturing process, a laser cut may be made during a single manufacturing process to place the first and second conduit openings within each of the plural fins. Consequently, manufacturing time may be reduced.

Figure 5:
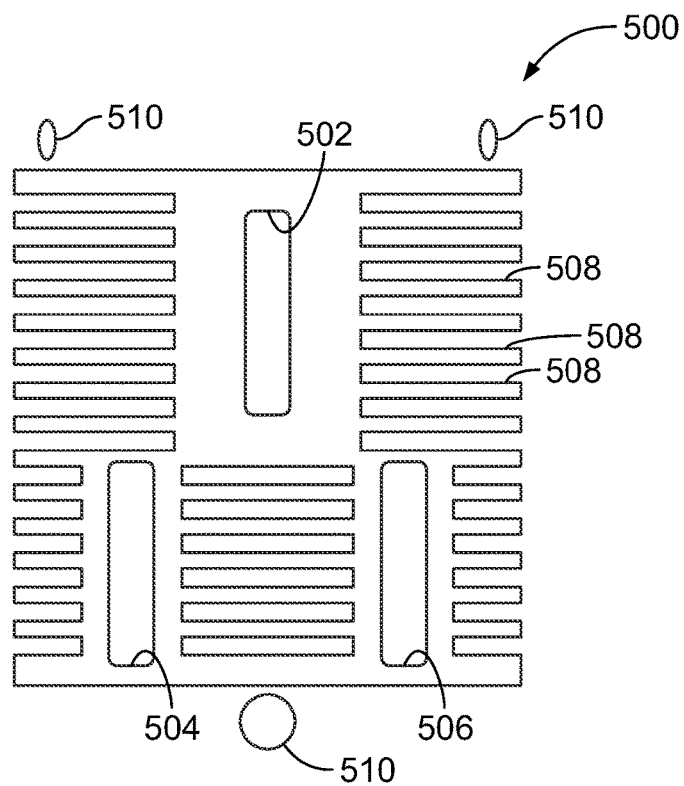
FIG. 5 illustrates a front plan view of a fin of a heat exchanger.

FIG. 5 illustrates a front view of an example fin 500. The fin may include a first conduit opening 502, second conduit opening 504, and a third conduit opening 506. Specifically, the first conduit opening may be used for receiving a first fluid carrying conduit that is configured to carry a first fluid at a high temperature, and both the second and third conduit openings may be used to receive fluid carrying conduits that are configured to carry a second and third fluids of the same or different temperatures as that of the first conduit. The second and third openings may be used to receive fluid carrying conduits that are carrying cooler temperature fluid such that the fin transfers heat from the first fluid carrying conduit to both a second and third fluid carrying conduit. The fin may also include plural slots 508 disposed therein. The plural slots not only reduce the amount of pressure drop across the fin, but additionally increases fin surface area to increase heat transfer.

Optionally, the structural member 510 may be disposed around each fin to provide additional cooling capacity to the heat exchanger by allowing a fourth fluid that passes along the direction of the plane of the fin, or subtends an angle with the plane. Specifically, with the openings and slots within each fin, structural members may be provided for additional support as deemed necessary to maintain the structural integrity of the heat exchanger.

Thus, provided is a heat exchanger with angled fins that transfer heat from a conduit to contain a first, high temperature fluid to at least one conduit configured to contain a second, low temperature fluid. By angling, or inclining the fins, more fin area per unit length of the fluid conduit is provided. Consequently, more heat may be transferred between the conduit configured to contain the high temperature fluid to each of the plural fins. Manufacturability and assembly may be improved without sacrificing design or package size. To this end, the heat exchanger may be reduced if desired, also improving on design flexibility.

In one or more embodiments, a heat exchanger may include a first fluid carrying conduit extending along a first axis and may be configured to convey a first fluid at a first temperature. The heat exchanger may also include a second fluid carrying conduit extending along a second conduit axis and configured to convey a second fluid at a cooler, second temperature, and at least one fin having a first opening for coupling to the first fluid carrying conduit and a second opening for coupling to the second fluid carrying conduit. The at least one fin may extend along a fin axis that forms an acute angle or obtuse angle with at least one of the first conduit axis or the second conduit axis.

In one embodiment, the first fluid carrying conduit has at least one of a circular cross-section, a rectangular cross-section, or a triangular cross-section. In one embodiment, the first conduit axis may be parallel to the second conduit axis. In one embodiment, the at least one fin may include a first fin positioned in parallel to a second fin. In one embodiment, the acute angle formed between the fin axis and the at least one of the first conduit axis or the second conduit axis may be in a range of from about 15° to about 75° or the obtuse angle formed between the fin axis and the at least one of the first conduit axis or the second conduit axis may be in a range of from about 105° to about 175°.

In one embodiment, the first fluid carrying conduit may convey at least one of water, steam, or air as the first fluid. In one embodiment, the fin axis may form a first acute angle with the first conduit axis and may form a second acute angle with the second conduit axis, or the fin axis may form a first obtuse angle with the first conduit axis and may form a second obtuse angle with the second conduit axis. In one embodiment, the first acute angle and the second acute angle may be equivalent, or the first obtuse angle and second obtuse angle may be equivalent. In one embodiment, a metal material may surround the first opening or the second opening to transfer thermal energy between (a) the first fluid carrying conduit or the second fluid carrying conduit and (b) the at least one fin. In one embodiment, at least one fin may include plural slots disposed therein. In one or more embodiments, a heat exchanger may be provided that may include a fluid carrying conduit extending along an axis. The heat exchanger may provide a first fin having a first opening for receiving the fluid carrying conduit. The first fin may have a front surface and a back surface, the front surface and the back surface each intersecting the axis to form an acute or obtuse angle with the axis. In one embodiment, the fluid carrying conduit may be a first fluid carrying conduit, and the axis may be a first axis, and the heat exchanger may also include a second fluid carrying conduit that may have a second axis. The front surface and the back surface of the first fin may each intersect the second axis to form an acute or obtuse angle with the second axis. In one embodiment, the heat exchanger may include a second fin positioned in parallel to the first fin.

In one embodiment, the acute or obtuse angle may be an acute angle that may be in a range of from about 15° and 75° or an obtuse angle that may be in a range of from about 105° to about 175°. In one or more embodiments a heat exchanger may include a first fluid carrying conduit extending along a first axis and to convey a first fluid at a first temperature, and a second fluid carrying conduit extending along a second conduit axis and configured to convey a second fluid at a cooler, second temperature. The heat exchanger may include a first fin that may have a first opening for receiving the first fluid carrying conduit, and a second opening for receiving the second fluid carrying conduit, the first fin extending between the first fluid carrying conduit and the second fluid carrying conduit. The heat exchanger may also include a second fin that may have a first opening for receiving the first fluid carrying conduit and a second opening for receiving the second fluid carrying conduit, the second fin spaced from the first fin and extending between the first fluid carrying conduit and the second fluid carrying conduit. Additionally, the first fluid carrying conduit, the second fluid carrying conduit, the first fin, and the second fin may form a rhomboid. In one embodiment, the first fluid carrying conduit may have at least one of a circular cross-section, a rectangular cross-section, or a triangular cross-section. In one embodiment, the first fluid carrying conduit may form an angle in a range of from about 15° to about 75° with the first fin. Alternative, the angle may be in a range of from about 105° to about 175° with the first fin. In one embodiment, the first fluid carrying conduit may form an angle in a range of from about 15° to about 75° with the second fin. Alternative, the angle may be in a range of from about 105° to about 175° with the second fin. In one embodiment, the fluid conveyed within the first fluid carrying conduit may be at a liquid or a gas. This includes water, air, steam, refrigerant, a pure substance, or the like. A suitable liquid may include water as a solution or an emulsion. A suitable solution may include water and a glycol. Another liquid may include lubricants, such as engine lubricants. Other additives may be added to the fluid, such as anti-corrosion, oil, lubricant, anti-foam, dispersants, and the like. These additives may condition the fluid and/or the surfaces into which it comes in contact. Suitable gases may include air and combustion by-products.

In one embodiment, a seal may be provided between the first fluid carrying conduit and the first fin. Suitable materials for the seal may include metals, particularly soft metals such as copper, aluminum, zinc and lead. Other suitable materials may include polymers, particularly high temperature capable polymeric materials. These polymeric materials may include fillers, and these fillers may be non-polymeric. An example of a filled polymer may be a nylon filled with copper flake. In one embodiment, the seal may be formed by the use of a thermal gel or paste that has characteristics of enhancing the contact heat transfer between the fluid conduit and the fin.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A heat exchanger comprising:
a first fluid carrying conduit of a gas turbine extending along a first conduit axis and configured to convey a first fluid at a first temperature;
a second fluid carrying conduit of the gas turbine extending along a second conduit axis and configured to convey a second fluid at a cooler, second temperature;
a first fin having a first opening for coupling to the first fluid carrying conduit and a second opening for coupling to the second fluid carrying conduit, the first fin extending along a first fin axis that subtends an acute angle or obtuse angle with at least one of the first conduit axis or the second conduit axis to transfer heat from the first fluid carrying conduit to the second fluid carrying conduit that exits the heat exchanger; and
a second fin having a first opening for coupling to the first fluid carrying conduit and a second opening for coupling to the second fluid carrying conduit, the second fin extending along a second fin axis that subtends an acute angle or obtuse angle with at least one of the first conduit axis or the second conduit axis and positioned adjacent to and aligned with the first fin along the first conduit axis and the second conduit axis to transfer heat from the first fluid carrying conduit to the second fluid carrying conduit that exits the heat exchanger.

2. The heat exchanger of claim 1, wherein the first fluid carrying conduit has at least one of a circular cross-section, a rectangular cross-section, or a triangular cross-section.

3. The heat exchanger of claim 1, wherein the first conduit axis is parallel to the second conduit axis.

4. The heat exchanger of claim 1, wherein the first fin is positioned in parallel to the second fin.

5. The heat exchanger of claim 1, wherein the acute angle formed between the first fin axis and the at least one of the first conduit axis or the second conduit axis is in a range between 15° and 75° or the obtuse angle formed between the first fin axis and the at least one of the first conduit axis or the second conduit axis is in a range between 105° and 175°.

6. The heat exchanger of claim 1, wherein the first fluid carrying conduit is configured to convey at least one of water, oil, air, or refrigerant as the first fluid.

7. The heat exchanger of claim 1, wherein the first fin axis forms a first acute angle with the first conduit axis and forms a second acute angle with the second conduit axis, or the first fin axis forms a first obtuse angle with the first conduit axis and forms a second obtuse angle with the second conduit axis.

8. The heat exchanger of claim 7, wherein the first acute angle and the second acute angle are equivalent, or the first obtuse angle and the second obtuse angle are equivalent.

9. The heat exchanger of claim 1, wherein a metal material surrounds the first opening or the second opening to transfer thermal energy between (a) the first fluid carrying conduit or the second fluid carrying conduit and (b) the first fin.

10. The heat exchanger of claim 1, wherein first fin includes plural slots disposed therein.

11. A heat exchanger comprising:
a fluid carrying conduit of a gas turbine extending along an axis; and
a first fin having a first opening for receiving the fluid carrying conduit, the first fin having a front surface and a back surface, the front surface and the back surface each intersecting the axis to form a first acute or a first obtuse angle with the axis;

wherein the fluid carrying conduit is a first fluid carrying conduit, and the axis is a first axis, the heat exchanger further comprising: a second fluid carrying conduit having a second axis and that exits the heat exchanger, wherein the front surface and the back surface of the first fin each intersect the second axis to form a second acute or a second obtuse angle with the second axis.

12. The heat exchanger of claim 11, further comprising a second fin positioned in parallel to the first fin.

13. The heat exchanger of claim 11, wherein the first acute or the first obtuse angle is an acute angle that is in a range between 15° and 75° or an obtuse angle that is in a range between 105° and 175°.

14. A heat exchanger comprising:
  a first fluid carrying conduit of a gas turbine extending along a first axis and configured to convey a first fluid at a first temperature;
  a second fluid carrying conduit of the gas turbine extending along a second conduit axis and configured to convey a second fluid at a cooler, second temperature;
  a first fin having a first opening for receiving the first fluid carrying conduit and a second opening for receiving the second fluid carrying conduit, the first fin extending between the first fluid carrying conduit and the second fluid carrying conduit; and
  a second fin having a first opening for receiving the first fluid carrying conduit and a second opening for receiving the second fluid carrying conduit, the second fin spaced from the first fin and extending between the first fluid carrying conduit and the second fluid carrying conduit;
  wherein the first fluid carrying conduit, the second fluid carrying conduit, the first fin, and the second fin form a rhomboid.

15. The heat exchanger of claim 14, wherein the first fluid carrying conduit has at least one of a circular cross-section, a rectangular cross-section, or a triangular cross-section.

16. The heat exchanger of claim 14, wherein the first fluid carrying conduit forms an angle in a range between, 15° and 75° or between 105° and 175° with the first fin.

17. The heat exchanger of claim 16, wherein the first fluid carrying conduit forms an angle in a range between, 15° and 75° or between 105° and 175° with the second fin.

18. The heat exchanger of claim 14, wherein copper provides a seal between the first fluid carrying conduit and the first fin.

* * * * *